(12) United States Patent
Schenk et al.

(10) Patent No.: US 9,976,506 B2
(45) Date of Patent: May 22, 2018

(54) METHOD AND DEVICE FOR CALIBRATING POST-INJECTIONS OF AN INTERNAL COMBUSTION ENGINE

(71) Applicant: Robert Bosch GmbH, Stuttgart (DE)

(72) Inventors: Michael Schenk, Ludwigsburg (DE); Rene Zieher, Edingen-Neckarhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/309,438

(22) PCT Filed: Apr. 21, 2015

(86) PCT No.: PCT/EP2015/058578
§ 371 (c)(1),
(2) Date: Nov. 7, 2016

(87) PCT Pub. No.: WO2015/172980
PCT Pub. Date: Nov. 19, 2015

(65) Prior Publication Data
US 2017/0152805 A1 Jun. 1, 2017

(30) Foreign Application Priority Data
May 13, 2014 (DE) ........................ 10 2014 208 992

(51) Int. Cl.
*F02D 41/24* (2006.01)
*F02D 41/40* (2006.01)
*F02D 41/12* (2006.01)

(52) U.S. Cl.
CPC ....... *F02D 41/247* (2013.01); *F02D 41/2467* (2013.01); *F02D 41/402* (2013.01);
(Continued)

(58) Field of Classification Search
CPC ........ F02D 41/402–41/405; F02D 2200/0602; F02D 41/2429–41/247
(Continued)

(56) References Cited

U.S. PATENT DOCUMENTS 6,062,193 A * 5/2000 Gatellier ............... F02D 35/023
123/299
6,823,834 B2 * 11/2004 Benson ................... F02D 41/22
123/299
(Continued)

FOREIGN PATENT DOCUMENTS

DE 10232356 A1 1/2004
DE 102008054409 A1 6/2010
(Continued)

OTHER PUBLICATIONS

International Search Report, dated Sep. 16, 2015, of the corresponding PCT application PCT/EP2015/058578 filed Apr. 21, 2015.

*Primary Examiner* — Erick Solis
*Assistant Examiner* — Robert Werner
(74) *Attorney, Agent, or Firm* — Norton Rose Fulbright US LLP; Gerard Messina

(57) ABSTRACT

A method for calibrating post-injections in a fuel injection system, including a fuel accumulator, of an internal combustion engine, in particular of a motor vehicle, in which it is provided in particular that the calibration of at least one post-injection takes place based on the pressure drop in the fuel accumulator caused by the fuel injection.

11 Claims, 5 Drawing Sheets

(52) U.S. Cl.
CPC ......... *F02D 41/403* (2013.01); *F02D 41/405* (2013.01); *F02D 41/123* (2013.01); *F02D 2200/0602* (2013.01); *Y02T 10/44* (2013.01)

(58) Field of Classification Search
USPC ............... 123/299; 701/103–104; 73/114.38, 73/114.43, 114.48
See application file for complete search history.

(56) References Cited

U.S. PATENT DOCUMENTS

| | | | | |
|---|---|---|---|---|
| 7,913,666 | B2* | 3/2011 | Achleitner | F02D 41/0087 123/447 |
| 2009/0254262 | A1* | 10/2009 | Kweon | F02D 35/023 701/104 |
| 2011/0106409 | A1* | 5/2011 | Walter | F02D 41/2432 701/103 |
| 2013/0327297 | A1* | 12/2013 | Sgatti | F02D 41/2467 123/456 |
| 2014/0100761 | A1* | 4/2014 | Empacher | F02D 41/2467 701/104 |

FOREIGN PATENT DOCUMENTS

| | | |
|---|---|---|
| DE | 102011075108 A1 | 8/2012 |
| DE | 102011007563 A1 | 10/2012 |
| JP | 2007303315 A | 11/2007 |
| JP | 2011526984 A | 10/2011 |
| JP | 2012102682 A | 5/2012 |

\* cited by examiner

METHOD AND DEVICE FOR CALIBRATING POST-INJECTIONS OF AN INTERNAL COMBUSTION ENGINE

FIELD

The present invention relates to a method for calibrating post-injections in a fuel injection system of an internal combustion engine, in particular of a motor vehicle. Moreover, the present invention relates to a computer program, a machine-readable data medium for storing the computer program, and an electronic control unit with the aid of which the method according to the present invention may be carried out.

BACKGROUND INFORMATION

Compliance with present and future emission standards requires an exhaust aftertreatment in internal combustion engines. Thus, for example, conventionally, common rail diesel engines require a system for regenerating a particle filter which is provided for exhaust gas treatment, whereby structural engine measures must be taken in order to increase the filter temperature for purposes of regeneration, and optionally to set the recirculation rate of an exhaust gas recirculation (EGR) system with the aid of an EGR valve and/or to set the feed rate of a fresh air mass with the aid of a throttle valve. In particular, reducing the EGR rate and supplying a larger fresh air mass by opening the throttle valve are used to increase the filter temperature.

In addition, for a fuel injection system discussed here, conventionally, post-injections are provided which are not instantaneously effective and are relatively late in terms of time, which react at the particle filter. The fuel quantity injected during the post-injection must be metered very precisely, the injection usually being divided into multiple partial injections following one another in rapid succession.

Examples of possible negative effects of an incorrectly metered post-injection include recirculation of uncombusted fuel, via the EGR, into an intake manifold of the internal combustion engine, an excessive temperature during the combustion in the particle filter due to a post-injection quantity that is too high, resulting in damage to filter components, and an excessively low temperature of the particle filter due to a post-injection quantity that is too low, so that regeneration is not possible.

Conventionally, the calibration or correction of late post-injections discussed here takes place indirectly with the aid of a temperature controller, the filter temperature being detected at or near the particle filter, and a correction being made to a temperature setpoint value stored in a control unit of the internal combustion engine. The entire setpoint quantity of the post-injection is used as the manipulated variable, individual injections not being taken into account or corrected.

One disadvantage of this procedure is that the concurrent correction of all partial injections may result in impermissible deviations of individual partial injections, and a mentioned temperature controller must be configured for each individual engine.

In the passenger vehicle sector, it is also conventional to correct pre-injections based on engine speed, for example with the aid of the conventional zero fuel calibration (ZFC) method. This calibration method requires a particular operating mode of the internal combustion engine or of the motor vehicle, for example coasting mode. However, it has been shown that a transfer of the ZFC learned values from pre-injections to late post-injections is possible only to a very limited extent, since the exhaust gas back-pressures differ greatly for various crank angle positions of the start of injection. An appropriately carried out back-pressure compensation is possible, but is associated with a high level of technical effort, and thus increased costs.

In the truck and commercial vehicle sector, the mentioned corrections of pre-injections are likewise carried out based on engine speed, the calibration taking place at idle speed of the internal combustion engine.

In addition, a method is described in German Patent Application No. DE 102 32 356 A1 for controlling injectors of a fuel metering system discussed here, in which the start of injection and the end of injection, and on this basis the injection time, which is a measure for the injected fuel quantity, are determined with the aid of a pressure sensor situated at a high-pressure fuel accumulator (rail). In particular, it is provided in the cited document that the values thus ascertained are compared to stored values, and in the event of a deviation of the start of injection, the injection duration is corrected in such a way that the deviation is eliminated.

SUMMARY

In accordance with the present invention, post-injections in a fuel injection system, which take place relatively late in terms of time, are calibrated or corrected based on the pressure drop or pressure dip caused by the particular post-injection in a mentioned fuel accumulator. This calibration or correction is preferably carried out individually for each cylinder of the internal combustion engine.

This is based on the experimentally demonstrated effect that the mentioned pressure drop for a late post-injection is generally proportional to the particular injection quantity within a relatively wide pressure range of approximately 200 bar to approximately 2000 bar, and the measured pressure drop therefore allows unequivocal conclusions to be drawn concerning the quantity of fuel that is injected during the post-injection.

The method provided according to the present invention may be implemented in a technically relatively simple, and therefore cost-effective, manner, and also provides a robust correction or calibration method for post-injections discussed here. In particular, no additional sensor system is necessary, since, with injection systems discussed here (common rail systems, for example), the method may be carried out using customary pressure sensors.

The evaluation of the mentioned pressure drop (in the case of a common rail injection system, the pressure drop in the rail) may take place based on differential pressure values that are ascertained within two temporal evaluation windows, whereby arithmetic averaging may preferably take place within the particular evaluation window.

In the method according to the present invention, it may also be provided that the mentioned evaluation of the pressure drop is carried out based on a calibration or correction of pre-injections which have already taken place, as the result of which it may be ensured that the pre-injections are correctly calibrated for each cylinder of the internal combustion engine. It may be provided in particular that the pressure drop which occurs for a pre-injection or pre-injections that has/have already been corrected or calibrated is compared to the post-injection, which is corrected corresponding to the pre-injection, the corrected pre-injection(s) being used as a reference.

Very high correction or calibration accuracy may be achieved with the mentioned comparative measurement or relative measurement.

The example method may be implemented for purposes of a quicker process or increased accuracy as control, in which post-injection(s) that is/are corrected using the pre-injection correction is/are used as a control variable, and the mentioned difference in the pressure drops is corrected by adjusting the control duration of the particular post-injection(s) as a manipulated variable. This procedure is preferably carried out in succession or concurrently for all cylinders of the internal combustion engine.

The mentioned method steps preferably take place in a suitable operating mode ("calibration mode") of the internal combustion engine, for example in coasting mode. It may be provided that this operating mode is not actively started, but, rather, that the mentioned method steps are carried out when the operating mode is, for example, already in normal operation of the internal combustion engine or the motor vehicle.

It is to be noted that the mentioned method steps, in particular the pressure measurement(s) and evaluation(s) or correction(s), do not have to be carried out in chronological succession or as a single unit, since intermediate results or values already present in a control unit are evaluated as soon as a correction value is present for at least one operating point, and this correction value is also used generally immediately. This has the advantage that correction values do not have to be present for all operating points. Alternatively, the evaluation does not take place until all data necessary for a final evaluation are present. In particular, in this case cylinder-individual reference values or control variables may be stored in corresponding characteristic maps, so that they are also available for subsequent evaluations.

The method according to the present invention may be used, with the advantages described herein, in particular in common rail high-pressure injection systems of diesel engines of any design, and in motor vehicles of any design (passenger vehicles, trucks, commercial vehicles which are not road-bound, etc.), and in direct-injection gasoline engines, in which a calibration of post-injections is necessary. In addition, use for internal combustion engines outside the field of automotive engineering, for example in chemical process engineering or the like, is possible.

The computer program according to the present invention is configured for carrying out each step of the method, in particular when it runs on a computer or a control unit. The computer program allows the method according to the present invention to be implemented on an electronic control unit without having to make structural changes to same. The machine-readable data medium on which the computer program according to the present invention is stored is provided for this purpose. By running the computer program according to the present invention on an electronic control unit, the electronic control unit according to the present invention is obtained, which is configured for controlling post-injections of an injection system discussed here with the aid of the method according to the present invention.

Further advantages and embodiments of the present invention result from the description herein and the figures.

It is understood that the features mentioned above and to be discussed below may be used not only in the particular stated combination, but also in other combinations or alone without departing from the scope of the present invention.

DETAILED DESCRIPTION OF EXAMPLE EMBODIMENTS

Figure 1:
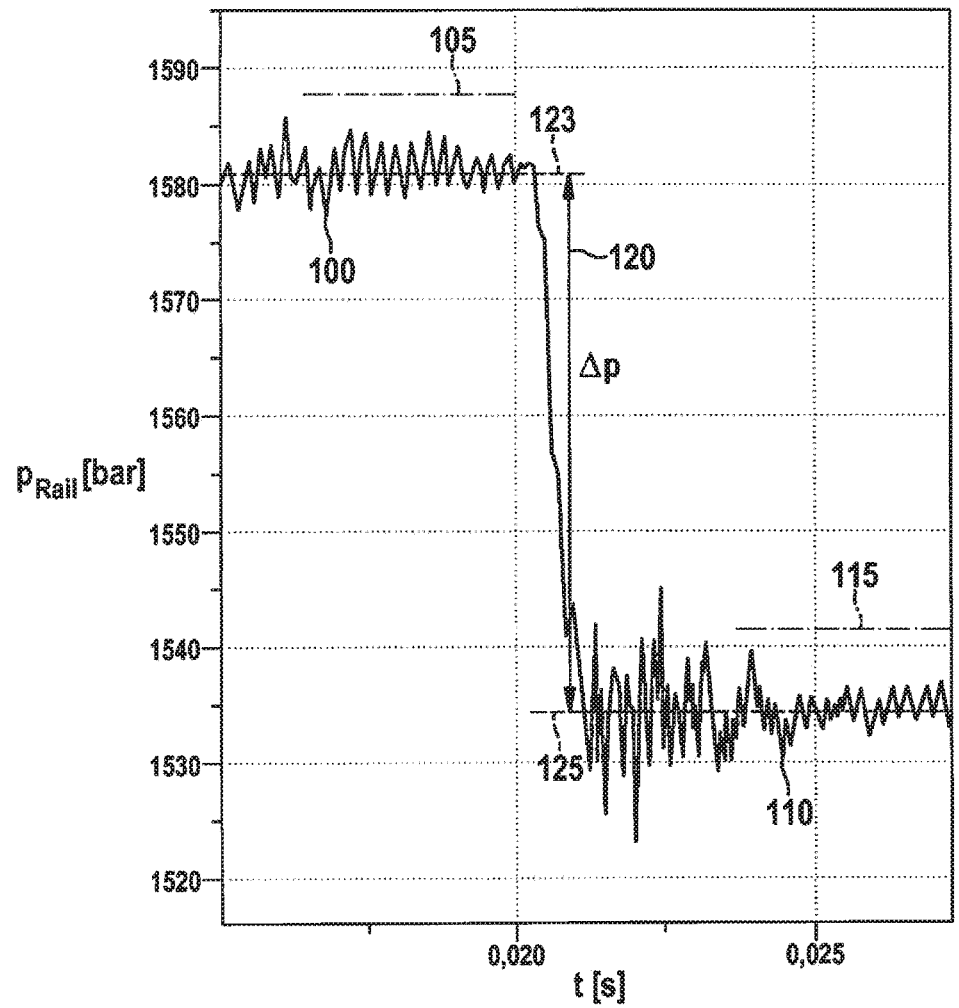
FIG. 1 shows an example of a pressure drop of a rail pressure signal during an injection.

FIG. 1 shows an example of a rail pressure curve in a common rail injection system during an injection, which in the present example takes place at a point in time of approximately t=0.020 s. Shown pressure drop (Δp) 120 resulting from the injection, from an initial pressure 100 having a first average value 123 to a final pressure 110 having a second average value 125, is used as the basis for the method described below. These average values 123, 125 are formed in temporal evaluation windows 105, 115, respectively.

Figure 2:
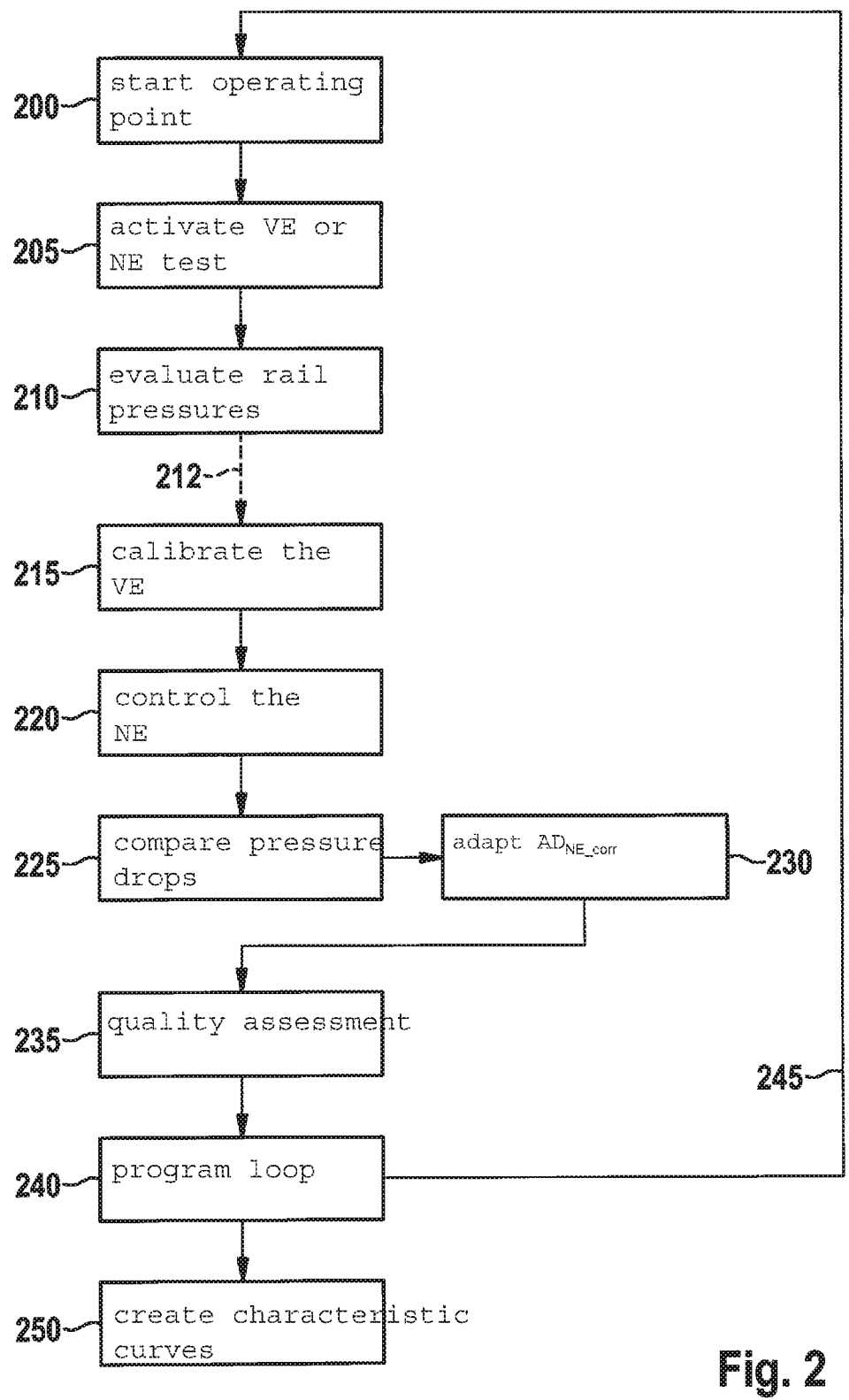
FIG. 2 shows a first exemplary embodiment of the method according to the present invention, based on a flow chart.

In the method shown in FIG. 2, the determination of the pressure drops of a pre-injection (VE) and a late post-injection (NE), as is apparent from FIG. 1, takes place based on the mentioned two evaluation windows 105, 115. In this exemplary embodiment, these evaluation windows have already been established during the manufacture of an internal combustion engine or an injection system, discussed here, of such an internal combustion engine, for example on an appropriate check device or test device.

For establishing the position and size of mentioned temporal evaluation windows for the VE as well as the NE, an operating point that is suitable for the calibration operation is initially started 200, for example a coasting mode, using the particular injection system that is present or the particular internal combustion engine. After this operating point is reached, a VE or NE test injection is activated 205, the point in time and duration of the test activation being determined according to standard values established in advance for the particular injection system. Rail pressure values $p_{rail}$ detected during the test activation are evaluated 210 in order to position the two evaluation windows before and after the test injection in such a way that in particular the transition range in which actual pressure drop $\Delta p_{rail}$ occurs is excluded from the particular evaluation window range.

According to the actual calibration process, as indicated by dashed-line arrow 212, initially the VE is calibrated 215 with regard to the pressure drop, resulting in a reference pressure drop $\Delta p_{VE\_ref}$ and an associated reference control duration $AD_{VE\_ref}$. This control duration $AD_{VE\_ref}$ is then used to control 220 the NE according to the relationship $AD_{NE\_corr}:=AD_{VE\_ref}$. The same methods are used to determine the VE pressure drop and the NE pressure drop. Pressure drop values $\Delta p_{VE}$ and $\Delta p_{NE}$ which result for the VE and the NE are subsequently compared 225 to one another, value $AD_{NE\_corr}$ being changed or adapted 230 in such a way that values $\Delta p_{VE}$ and $\Delta p_{NE}$ preferably match. It is assumed that the mentioned correlation of the injection quantity with the pressure drop value is the same for a VE and a late NE, and in particular does not depend on the exact point in time of the particular injection.

Steps 200 through 230 are preferably repeated until pressure values $\Delta p_{VE}$ and $\Delta p_{NE}$ match. In addition, steps 205 and 210 are preferably carried out repeatedly in order to ascertain a stable $\Delta p_{VE}$ value. Pressure values $\Delta p_{VE}$ and/or $\Delta p_{NE}$ which are ascertained in an appropriate number of measuring passes are subjected to a quality assessment 235 in a conventional manner. The mentioned measuring passes preferably take place for each individual cylinder, and at a speed of the internal combustion engine which is empirically determined in advance.

Thus, in the exemplary embodiment shown in FIG. 2, it is also provided to carry out the mentioned measuring passes as well as the particular ascertainment or determination of the evaluation windows for each cylinder at different speeds according to the program loop formed from step 240 and resulting skip 245, and, based on the data thus obtained, to create 250 characteristic curves $F_{Auswf\_pos}$ and $F_{Auswf\_duration}$, which are a function of speed $n_{BKM}$ of internal combustion engine (BKM), for the position and duration of the particular evaluation window according to the relationship $F_{Auswf\_pos}=f_1 (n_{BKM})$ and $F_{Auswf\_duration}=f_2 (n_{BKM})$.

In this case the underlying finding is that the evaluation windows must be adjusted generally only with respect to speed $n_{BKM}$, but the absolute fuel quantities for the particular injection (VE or NE) have no relevant influence on the calibration result, and therefore an adjustment with respect to the fuel quantities is not necessary. This is because at relatively low speeds, in a specified time frame longer evaluation windows may be used than at relatively high speeds, since at higher speeds the individual injections are closer together in terms of time, and therefore at low speeds, comparatively longer time periods for the evaluation windows are available between the individual injections. However, the longer the evaluation windows may be selected, the more quickly stable $\Delta p$ values are present. The reference point for determining a particular evaluation window is preferably the start of the energization of the particular injector.

As described below, the described method may be designed as a learning method, in particular the learning speed (for example, the iteration increment in the case of an iterative learning method) being predefined during the ascertainment of mentioned reference pressure drop $\Delta p_{VE\_ref}$ and correction value $AD_{NE\_corr}$.

Figure 3:
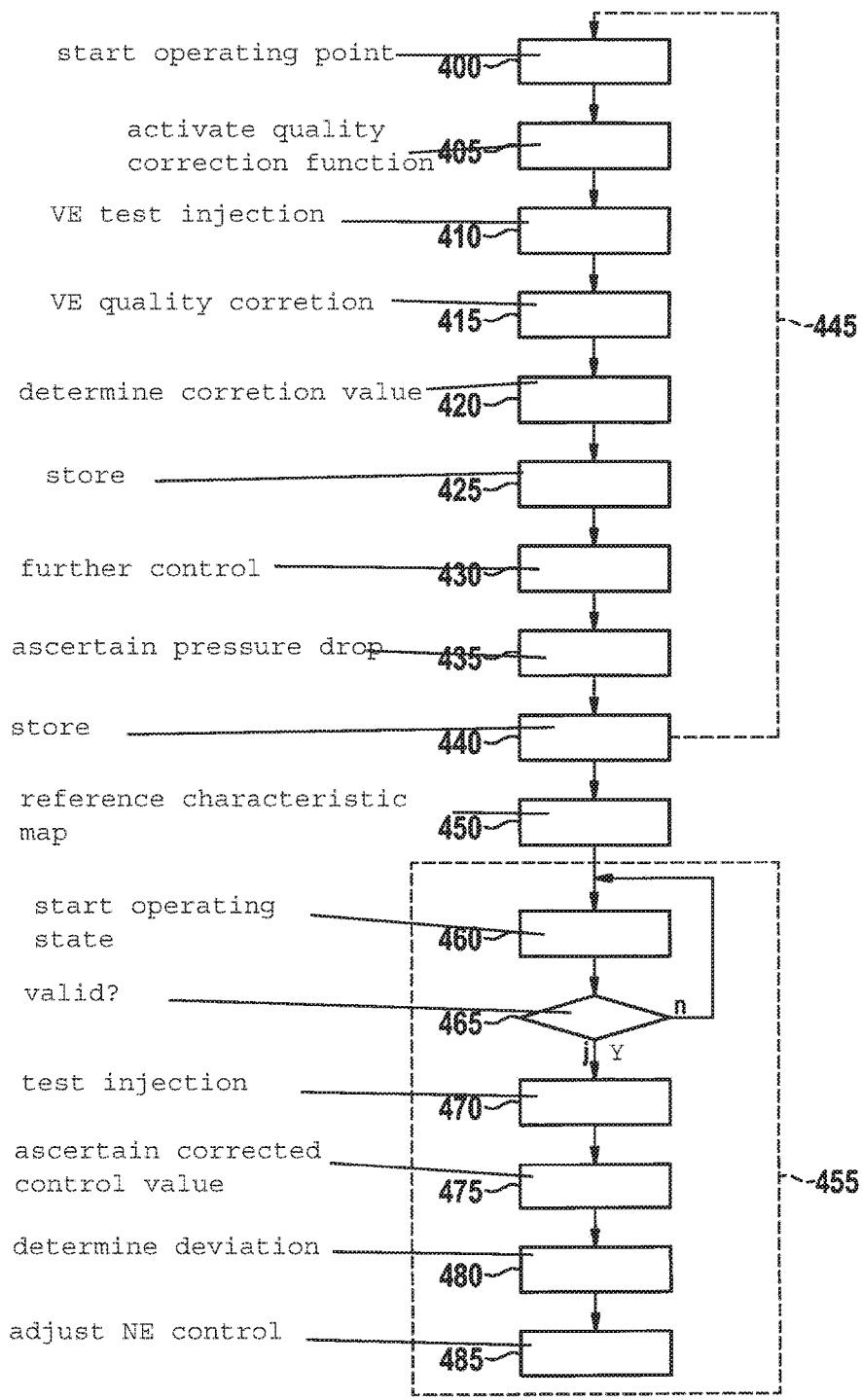
FIG. 3 shows a second exemplary embodiment of the method according to the present invention, based on a flow chart.

FIG. 3 shows one exemplary embodiment of the calibration method according to the present invention, which in the present case is carried out for an ith cylinder of the internal combustion engine. According to first step 400, preferably during normal operation of the internal combustion engine or during normal driving operation of a motor vehicle which includes the internal combustion engine, a suitable operating point for the calibration mode of the mentioned reference value is started, for example coasting mode. In a coasting mode of the internal combustion engine, the injection quantity is zero, since the foot of the vehicle driver leaves or does not step on the accelerator pedal. Within the coasting mode, rail pressure $p_{rail}$ and the control duration of the test injection may be varied for the VE as well as for the NE. As a result, in mentioned characteristic maps $KF_{REF,i}$ ($p_{rail}$, $AD_{test-VE}$) and $KF_{corr,NE,i}$ ($p_{rail}$, $AD_{test-VE}$), a preferably large number of measuring points or measured values may be taken into account, and preferably stable values for an operating point may be present.

Figure 4A:
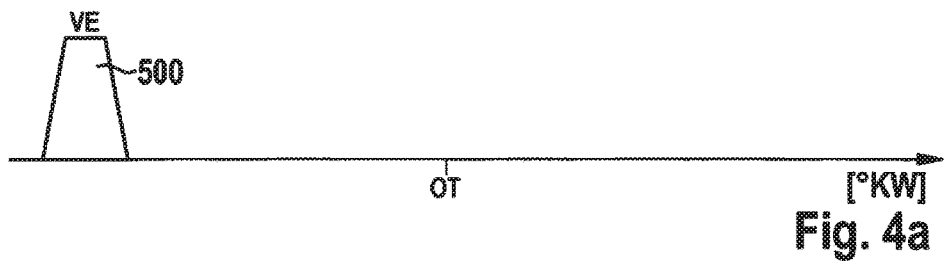
FIGS. 4a, 4b show examples of pre-injections and post-injections in the case of an individual injection at a cylinder of the internal combustion engine.

After this operating point or operating state is reached, a conventional VE quantity correction function is activated 405, and a VE test injection 500, illustrated in FIG. 4a, having control duration $AD_{test-VE}$ and being temporally controlled before top dead center (OT), is provided 410 on the ith cylinder. In this illustration, the x (time) axis corresponds to crank angle (° KW) which is determined on a crankshaft of the internal combustion engine.

For VE quantity correction 415, which is carried out 415 for an ith cylinder of the internal combustion engine, a correction value of control duration $\Delta AD_{VE}$ is determined 420, and this value $\Delta AD_{VE}$ is stored 425 in a corresponding characteristic map $KF_{corr,VE,i}$ for the ith cylinder according to the relationship $\Delta AD_{VE}=KF_{corr,VE,i}$ ($p_{rail}$, $AD_{test-VE}$).

During a further control 430 having the control duration which is corrected according to the relationship $AD_{VE\_corr}=AD_{VE\_instantaneous}+\Delta AD_{VE}$, the resulting pressure drop is ascertained 435, and is stored 440 as the reference pressure drop value in a mentioned reference characteristic map $KF_{REF,i}$ of the ith cylinder according to the relationship $\Delta p_{REF}=KF_{REF,i}$ ($p_{rail}$, $AD_{test-VE}$).

As indicated by dashed-line arrow 445, mentioned steps 400 through 440 are carried out repeatedly for various rail pressures $p_{rail}$ and various control durations $AD_{test-VE}$ in order to create reference learning characteristic map $KF_{REF,i}$ of the ith cylinder. The result 450 is a reference characteristic map $KF_{REF,i}$ which takes into account preferably different rail pressures and control durations. In addition, steps 400 through 440 are carried out multiple times according to dashed-line arrow 445 for a control duration $AD_{test-VE}$ at the same $p_{rail}$ in order to obtain preferably stable values of these variables.

As described above, the data ascertained for the mentioned VE are used in the calibration of a late NE. These NE calibration steps are demarcated with respect to the prior calibration steps by dashed line 455 for better clarity.

Once again, an operating state which is suitable for the NE calibration mode, for example a mentioned coasting mode, is initially started 460, preferably during normal operation of the internal combustion engine. A check is made in subsequent check step 465 as to whether a valid reference value $\Delta p_{REF}$ is present for this operating point. If this is the case, the method is continued. Otherwise, a skip is made back to step 460 and a different operating point is started.

Figure 4B:
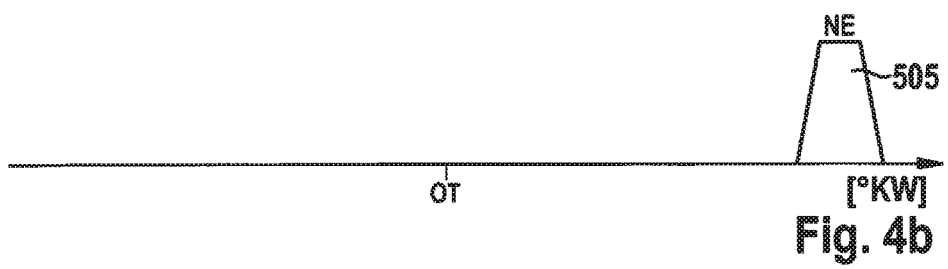

If condition 465 is met, an NE test injection 505, illustrated in FIG. 4b, having an NE start of injection (crank angle) which is customary, i.e., provided according to standard, for the present injection system and having a customary injection duration, and with the individual injection corrected using control duration correction value $\Delta AD_{VE}$ determined in preceding steps 410 through 425, is controlled 470 at the ith cylinder, in particular according to the relationship: $AD_{NE\_instantaneous}=AD_{VE\_instantaneous}+\Delta AD_{VE}$. Pressure drop $\Delta p_{NE}$ which is effectuated during the NE, using appropriately corrected control value $AD_{NE\_corr}=AD_{NE\_instantaneous}+\Delta AD_{NE}$, is ascertained 475, and the deviation from mentioned reference value $\Delta p_{REF}$ is determined 480 based on reference learning characteristic map $KF_{REF}$ according to the relationship $\Delta(\Delta p)=\Delta p_{REF}-\Delta P_{NE}$.

Deviation $\Delta(\Delta p)$, which is ascertained 480 as described, is subsequently minimized by adjusting 485 the NE control duration. The following relationship for control duration ($AD_{NE,k}$) applies for the NE control duration of the test injection: $AD_{NE,k}=AD_{test\ VE}+\Delta AD_{NE,k}+\Delta AD_{VE}$. Index k is intended to clarify that multiple test injections carried out in succession are necessary for reasons of statistical scattering and for achieving a stable value of control duration correction $AD_{NE,k}$ for the mentioned minimization, and therefore steps 460 through 485 are preferably carried out multiple times. It is likewise preferred that in each case different, preferably stable, operating states with regard to the particular injection are initiated. This procedure allows the ascertainment of a number of measuring points, and thus the creation of a mentioned characteristic map.

Alternatively, described steps 460 through 485, as mentioned, may then also be carried out or started to be carried out as soon as such an operating state is already present during customary operation of the internal combustion engine or the motor vehicle.

In this exemplary embodiment, the mentioned minimization takes place based on the following relationship for control error ($\Delta(\Delta p)$) which results after n test injections: $\Delta(\Delta p)=\Delta p_{REF}-\Delta p_{NE}(AD_{NE,\,k \rightarrow n})\approx 0$.

Due to the test injections being carried out in succession, the calibration method takes place piece by piece, not successively, whereby intermediate values of the injection quantities which are already detected are stored in a learning characteristic map $KF_{corr,NE,i}$ ($p_{rail}$, $AD_{NE,k}$) which is individual for each cylinder, as a function of rail pressure $p_{rail}$ and corrected control duration $AD_{NE,k}$. Accordingly, in the learned state the NE control duration corrections are available as manipulated variables in characteristic map $KF_{corr,NE,i}$, with the aid of which the NE of the ith cylinder may be corrected, with index k→n. Considered in the appropriately "stabilized" state, index k therefore no longer needs to be taken into account, so that in this state the following relationship (1) results:

$$\Delta AD_{NE}=KF_{corr,NE,i}(p_{rail},\, AD_{test\text{-}VE}) \quad (1)$$

If an appropriately learned correction value is present, and the NE calibration (as described above) is enabled, NE control duration correction $\Delta AD_{NE}$ for the ith cylinder may be taken from characteristic map $KF_{corr,NE,i}$ at the instantaneous operating point for the NE. The corrected NE control duration is made up overall of correction value VE (according to step 420), the correction value for the NE (according to relationship (1)), and the setpoint value of NE control duration $AD_{NE,\,setpoint}$, in particular according to the following relationship (2):

$$\Delta AD_{NE,\,corr,overall}=AD_{NE,\,setpoint}+\Delta AD_{VE,\,corr}+\Delta AD_{NE} \quad (2)$$

It is to be noted that an interpolation or extrapolation of characteristic map values is possible if the calibration has not been carried out using the typical NE quantities or under the typical criteria for the normal operation of the injection system or the internal combustion engine, for example at rail pressures or with control durations $AD_{test\text{-}VE}$ of the VE test injections which are not the same as NE control duration $AD_{NE,\,setpoint}$ which is desired during actual operation of the internal combustion engine or the injection system.

In addition, it is to be emphasized that, as previously mentioned and indicated by arrow 485, steps 400 through 485 are carried out in succession or optionally concurrently for each cylinder i. The method sequence may be accelerated by already determining NE correction values for cylinders for which reference values are already present, and in parallel thereto, ascertaining reference values for the remaining cylinders. This is based on the effect that, due to the relatively long time interval between a VE and a late NE, the initiation of the NE generally does not influence the calibration of the VE, and conversely, there is no influence on the NE by the VE. When reference values are present for all cylinders, an alternative or additional acceleration of the method may be achieved by carrying out the NE calibration simultaneously on all cylinders. For the mentioned paths of parallelization, the only requirement or limitation is that preferably no influencing of the emissions and of the operating or driving characteristics occurs.

Figure 5A:
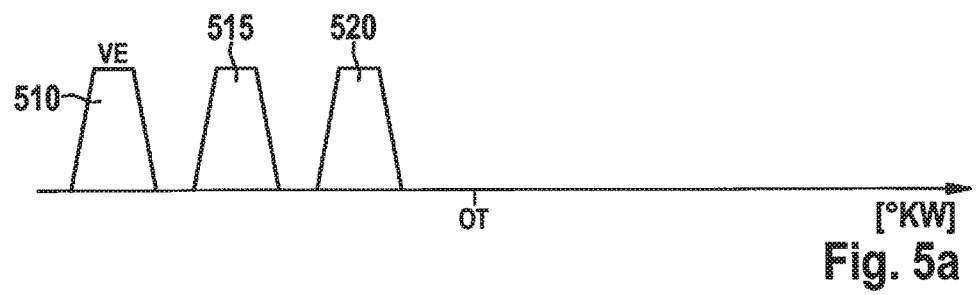
FIGS. 5a, 5b show examples of pre-injections and post-injections in the case of a multiple injection at a cylinder of the internal combustion engine.
Figure 5B:
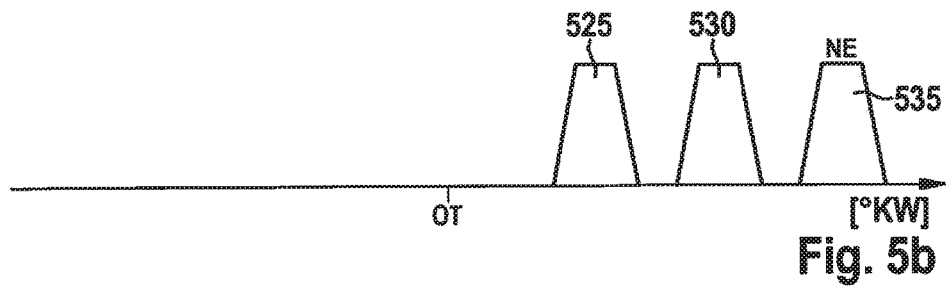

FIGS. 5a and 5b illustrate one alternative embodiment of the method in which multiple pre-injections 510, 515, 520 and multiple post-injections 525, 530, 535 take place. The procedure for calibrating the post-injections is the same as the procedure described above.

For the multiple injections shown, the same injection or injection quantity is provided multiple times in succession on one cylinder, and the resulting pressure dip in the rail is measured. With the aid of the shown multiple injections, an increase in the signal swing may be achieved compared to single injections (FIGS. 4a and 4b). More rapid learning or an increase in the calibration accuracy is possible due to the increase in the signal swing. Whether single or multiple injections are more advantageous may be determined based on the effects on the emissions and the operating or driving characteristics.

Figure 6A:
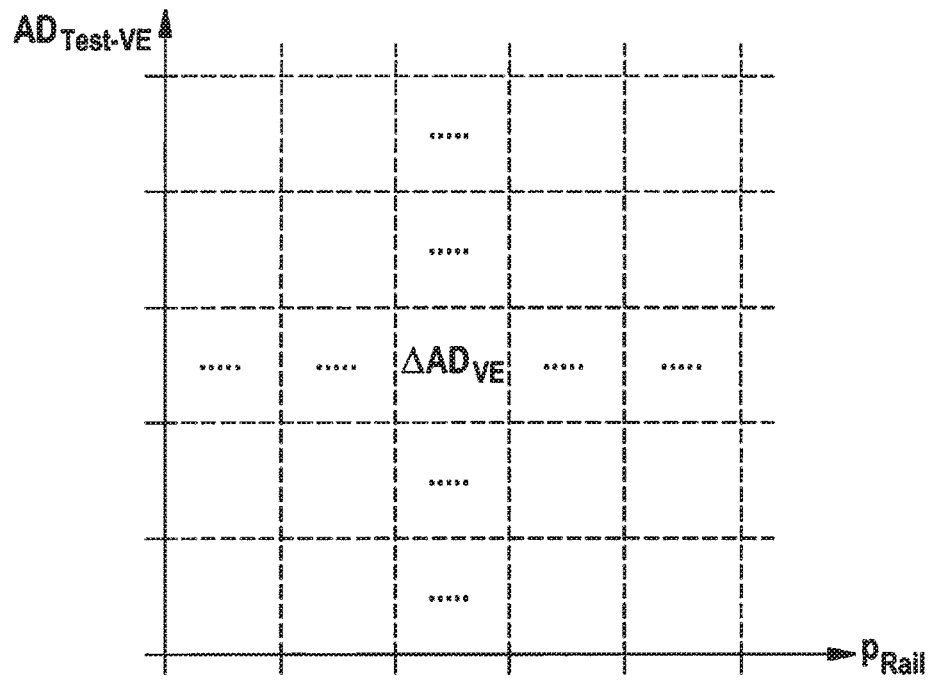
FIGS. 6a, 6b show learning characteristic maps for pre-injections and post-injections created according to the method depicted in FIG. 3.
Figure 6B:
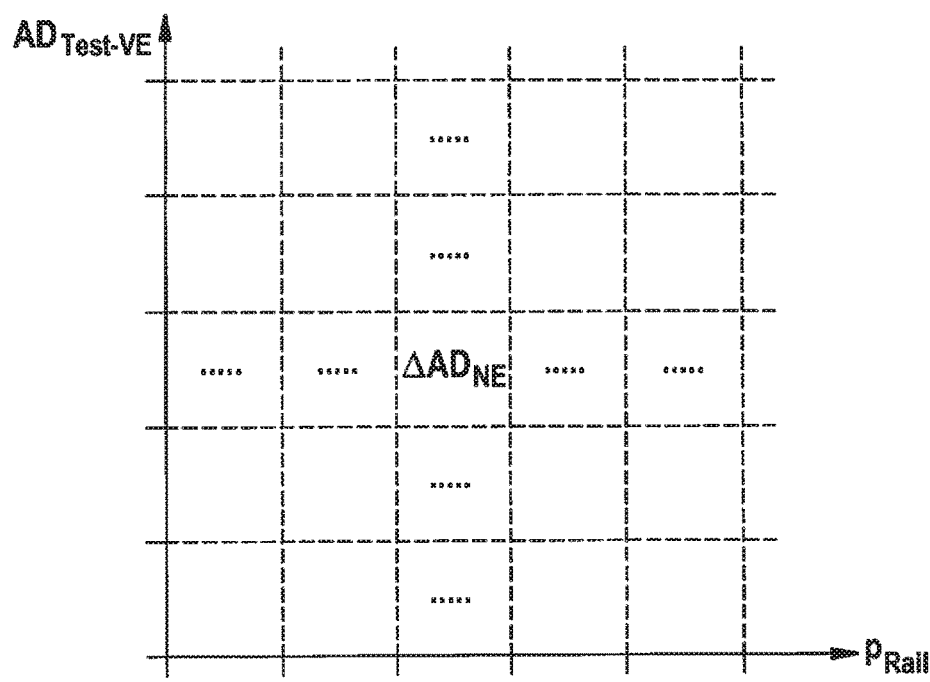

In the characteristic maps shown in FIGS. 6a and 6b, in each case correction values of control duration $\Delta AD_{VE}$ and $\Delta AD_{NE}$ obtained during the described calibration are depicted or plotted as a function of rail pressure $p_{rail}$ on which the particular calibration is based, and the particular control duration $AD_{test\text{-}VE}$ used for the described test pre-injection. Accordingly, corresponding correction values for a certain rail pressure $p_{rail}$ and a certain control duration $AD_{test\text{-}VE}$ may be subsequently read out from these characteristic maps, with the aid of which the described controls are to take place.

The described method may be implemented in the form of a control program for an electronic control unit for controlling an internal combustion engine, or in the form of one or multiple corresponding electronic control units (ECUs).

What is claimed is:

1. A method for calibrating post-injections in a fuel injection system, including a fuel accumulator, of an internal combustion engine of a motor vehicle, the method comprising:
   determining a pressure drop in the fuel accumulator caused by a pre-injection;
   calibrating the post-injections by performing:
   (a) performing a post-injection,
   (b) determining a pressure drop in the fuel accumulator caused by the post-injection,
   (c) comparing the pressure drop caused by the pre-injection to the pressure drop caused by the post-injection,
   (d) adjusting a duration of a subsequent post-injection based on a difference between the pressure drop caused by the pre-injection and the pressure drop caused by the post-injection, and
   (e) repeating steps (a)-(d) until the pressure drop caused by the pre-injection and the pressure drop caused by the post-injection are the same; and
   after the calibrating, performing subsequent post-injections based on the adjusted duration.

2. The method as recited in claim 1, wherein the calibrating is carried out individually for each cylinder of the internal combustion engine.

3. The method as recited in claim 1, wherein the pressure drop caused by the post-injection is evaluated based on differential pressure values that are ascertained within two temporal evaluation windows.

4. The method as recited in claim 3, wherein arithmetic averaging takes place within the evaluation windows.

5. The method as recited in claim 1, wherein the calibrating is carried out in succession or concurrently for all cylinders of the internal combustion engine.

6. The method as recited in claim 1, wherein the calibrating takes place in an operating mode of the internal combustion engine.

7. The method as recited in claim 6, wherein the method steps are not carried out in chronological succession, a calibration value being determined from intermediate results that are already present for at least one operating point, and this calibration value being used for subsequent post-injections.

8. The method as recited in claim 6, wherein the method steps are not carried out in chronological succession, intermediate results that are already present being buffered, and a final evaluation taking place only when data necessary for the final evaluation are present.

9. The method as recited in claim 8, wherein at least one of cylinder-individual reference values and control variables are stored in characteristic maps.

10. A non-transitory machine-readable data medium on which is stored a computer program for calibrating post-injections in a fuel injection system, including a fuel accumulator, of an internal combustion engine of a motor vehicle, the computer program, when executed by a control unit, causing the control unit to perform:
   determining a pressure drop in the fuel accumulator caused by a pre-injection;
   calibrating the post-injections by:
      (a) performing a post-injection,
      (b) determining a pressure drop in the fuel accumulator caused by the post-injection,
      (c) comparing the pressure drop caused by the pre-injection to the pressure drop caused by the post-injection,
      (d) adjusting a duration of a subsequent post-injection based on a difference between the pressure drop caused by the pre-injection and the pressure drop caused by the post-injection, and
      (e) repeating steps (a)-(d) until the pressure drop caused by the pre-injection and the pressure drop caused by the post-injection are the same; and
   after the calibrating, performing subsequent post-injections based on the adjusted duration.

11. An electronic control unit which is configured for calibrating post-injections in a fuel injection system, including a fuel accumulator, of an internal combustion engine of a motor vehicle, the control unit designed to:
   determine a pressure drop in the fuel accumulator caused by a pre-injection;
   calibrate the post-injections by:
      (a) actuating a post-injection,
      (b) determining a pressure drop in the fuel accumulator caused by the post-injection,
      (c) comparing the pressure drop caused by the pre-injection to the pressure drop caused by the post-injection,
      (d) adjusting a duration of a subsequent post-injection based on a difference between the pressure drop caused by the pre-injection and the pressure drop caused by the post-injection, and
      (e) repeating steps (a)-(d) until the pressure drop caused by the pre-injection and the pressure drop caused by the post-injection are the same; and
   after the calibration, controlling subsequent post-injections based on the adjusted duration.

* * * * *